United States Patent
Johansen et al.

(10) Patent No.: US 10,066,185 B2
(45) Date of Patent: Sep. 4, 2018

(54) SYSTEM AND METHOD FOR ENHANCING HYDRAULIC FLUIDS FOR DOWN HOLE USE

(75) Inventors: Yngve B. Johansen, Trondheim (NO); Bruce MacKay, Sugar Land, TX (US); James S. Almaguer, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 826 days.

(21) Appl. No.: 14/234,587

(22) PCT Filed: Jul. 26, 2012

(86) PCT No.: PCT/US2012/048214
§ 371 (c)(1),
(2), (4) Date: Aug. 6, 2014

(87) PCT Pub. No.: WO2013/016471
PCT Pub. Date: Jan. 31, 2013

(65) Prior Publication Data
US 2014/0338888 A1    Nov. 20, 2014

Related U.S. Application Data

(60) Provisional application No. 61/512,495, filed on Jul. 28, 2011.

(51) Int. Cl.
*E21B 36/00* (2006.01)
*C10M 127/04* (2006.01)
(Continued)

(52) U.S. Cl.
CPC .......... *C10M 127/04* (2013.01); *C09K 8/035* (2013.01); *C10M 169/04* (2013.01); *E21B 43/16* (2013.01);
(Continued)

(58) Field of Classification Search
CPC ................... E21B 43/16; E21B 36/00
See application file for complete search history.

(56) References Cited

U.S. PATENT DOCUMENTS 2,675,354 A * 4/1954 McChrystal ............. C09K 8/64
44/268
3,766,285 A 10/1973 Boggs et al.
(Continued)

FOREIGN PATENT DOCUMENTS

EP 0168534 A2 1/1986
GB 1170292 A 11/1969
(Continued)

OTHER PUBLICATIONS

European Search Report issued in related EP application 12817997.5 dated Apr. 29, 2015, 3 pages.
(Continued)

*Primary Examiner* — Catherine Loikith
(74) *Attorney, Agent, or Firm* — Michael Dae

(57) ABSTRACT

An enhanced hydraulic fluid comprises a conventional hydraulic fluid in combination with a predetermined amount of benzene by volume relative to the conventional hydraulic fluid. The predetermined amount of benzene preferably comprises between about 1.0% to about 20.0% benzene by volume, more preferably between about 1.5% to about 10.0% benzene by volume, and most preferably between about 2.0% to about 5.0% benzene by volume. The conventional hydraulic fluid may comprise electronics coolant liquids and oils. Conventional hydraulic fluids that may be mixed with benzene in the volumes described above include, but are not limited to, FLUORINERTS™ that include FC-43 and FC-70, including any perfluorinated, partially fluorinated, or partially chlorinated alkane with between about 3 to about 18 carbon atoms; mineral oils that include
(Continued)

CAPELLA™ brand mineral oil; ester oils (synthetic or natural) that include formidals, and MIDEL™ brand ester oils.

20 Claims, 10 Drawing Sheets

(51) Int. Cl.
  *F15B 21/06* (2006.01)
  *C10M 169/04* (2006.01)
  *C09K 8/035* (2006.01)
  *E21B 43/16* (2006.01)

(52) U.S. Cl.
  CPC ......... *F15B 21/06* (2013.01); *C10M 2203/06* (2013.01); *C10M 2203/1006* (2013.01); *C10M 2205/022* (2013.01); *C10M 2207/2805* (2013.01); *C10M 2207/401* (2013.01); *C10M 2211/0225* (2013.01); *C10M 2211/063* (2013.01); *C10N 2230/02* (2013.01); *C10N 2240/08* (2013.01)

(56) References Cited

U.S. PATENT DOCUMENTS

| | | | |
|---|---|---|---|
| 3,914,934 A | 10/1975 | Nestor | |
| 6,177,484 B1 * | 1/2001 | Surles | C08G 65/36 166/295 |
| 2002/0139962 A1 | 10/2002 | Fefer et al. | |
| 2007/0131422 A1 * | 6/2007 | Gatlin | C09C 1/30 166/280.1 |
| 2009/0233824 A1 | 9/2009 | Kuratomi et al. | |

FOREIGN PATENT DOCUMENTS

| | | |
|---|---|---|
| JP | S62158795 A | 7/1987 |
| RU | 2171830 C2 | 8/2001 |
| RU | 2229012 C2 | 5/2004 |
| RU | 2272117 C2 | 3/2006 |
| RU | 2331750 C1 | 8/2008 |
| RU | 2009136262 A | 4/2011 |

OTHER PUBLICATIONS

European Office Action issued in related EP application 12817997.5 dated May 28, 2015, 7 pages.
International Search Report for International Application No. PCT/US2012/048214 dated Nov. 22, 2012.
European Communication Article 94(3) issued in the related EP Application 12817997.5, dated Oct. 28, 2016 (5 pages).
International Written Opinion issued in the related PCT application PCT/US2012/048215, dated Nov. 22, 2012 (4 pages).
International Preliminary Report on Patentability issued in the related PCT application PCT/US2012/048216, dated Jan. 28, 2014 (5 pages).
Verevkin S.P., "Vapour Pressures and enthalpies of Vaporization of a series of the Linear n-alkyl-benzenes", J. Chem. Thermodynamics 38 (2006) 1111-1123.
Nikitin E.D., Popov P.A., Bogatishcheva N.S., "Vapor-Liquid Critical Properties of n-Alkylbenzenes from Toluene to 1-Phenyltridecane", J. Chem. Eng. Data 2002, 47, 1012-1016.
Ducoulombier D., Zhou H., Boned C., Peyrelasse J., Saint-Guirons H., Xans P., "Pressure (1-1000 bars) and temperature (20-100 DegC) dependence of the viscosity of liquid hydrocarbons". J. Phys. Chem. 1986, 90, (8), 1692-1700.

* cited by examiner

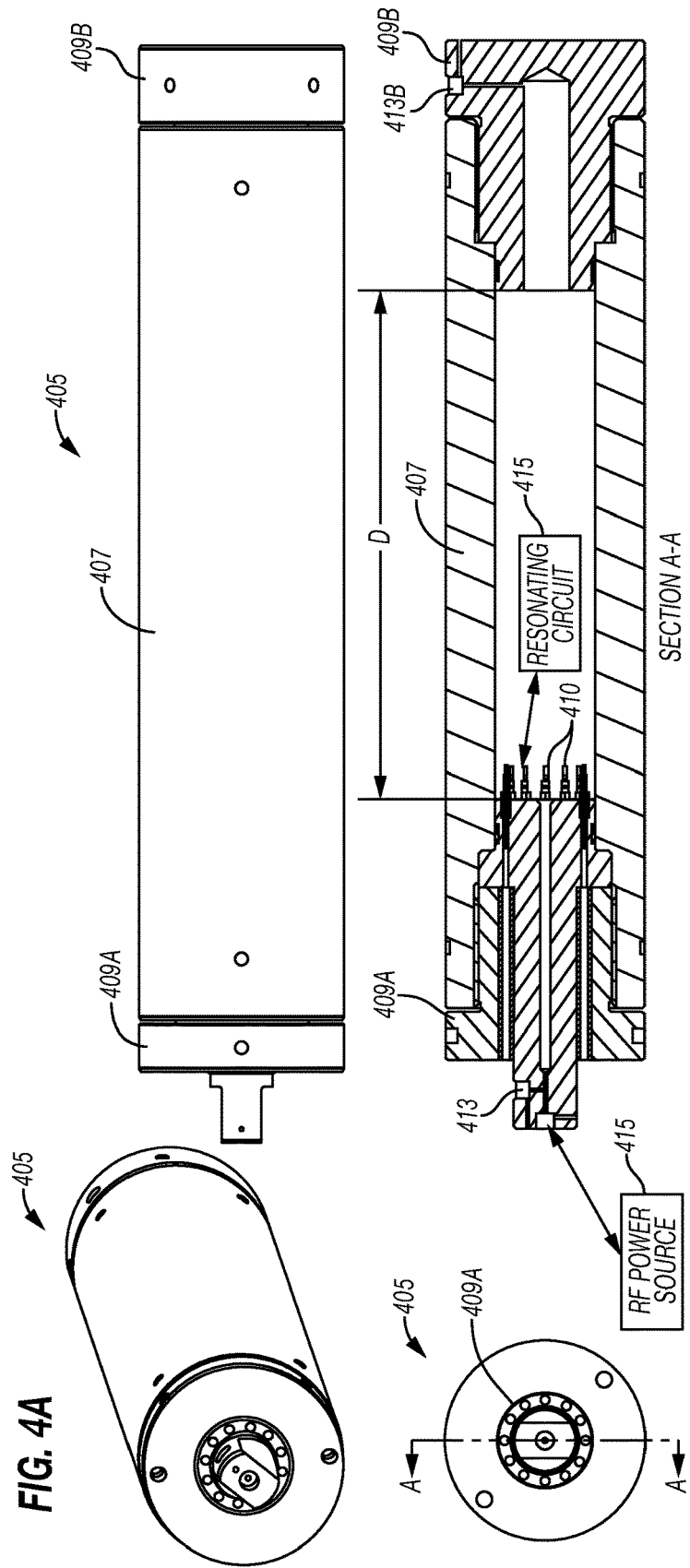

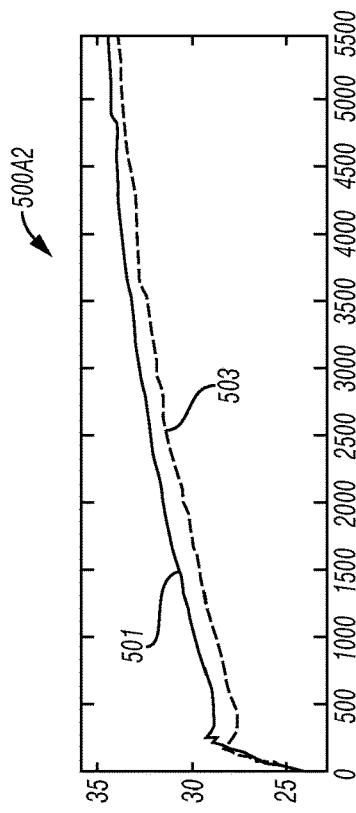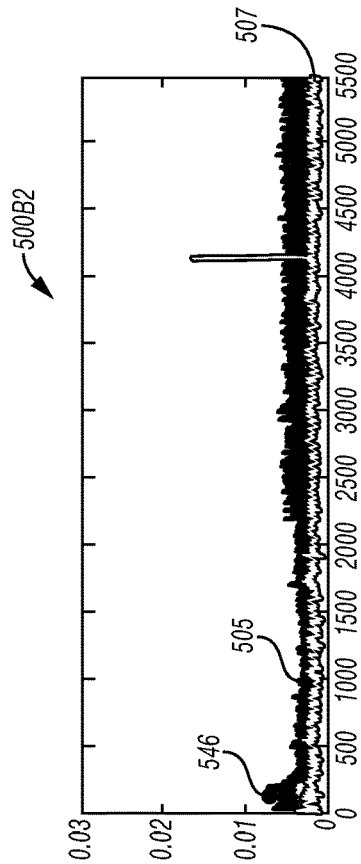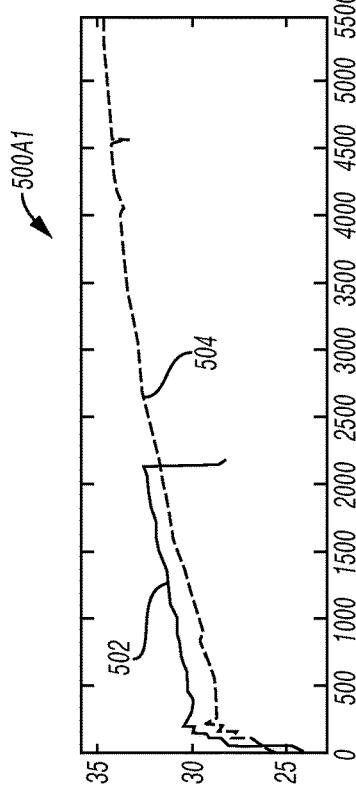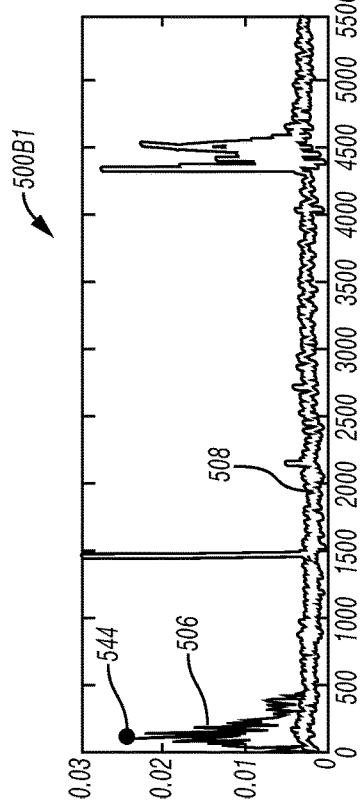
FIG. 5A1 - CONVENTIONAL ART
FIG. 5A2
FIG. 5B1 - CONVENTIONAL ART
FIG. 5B2

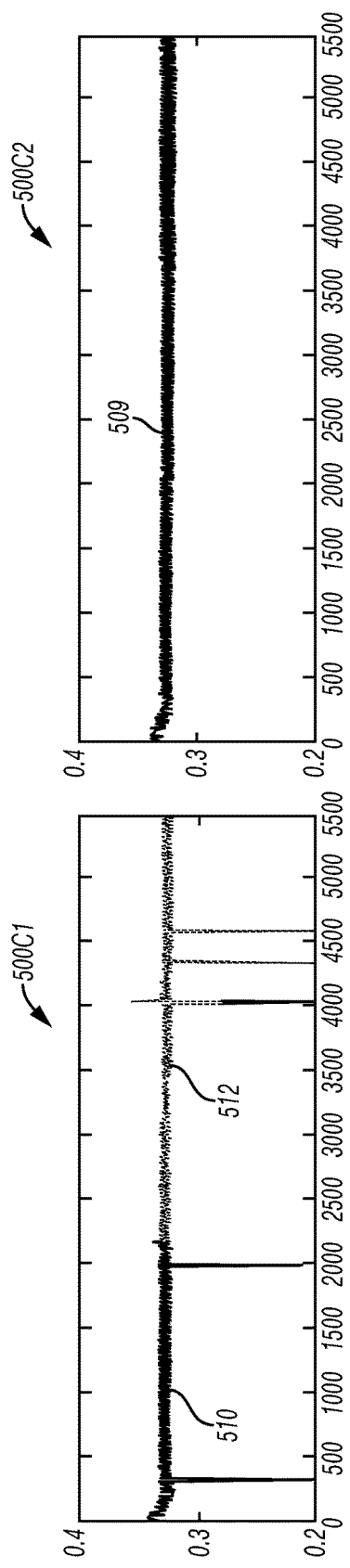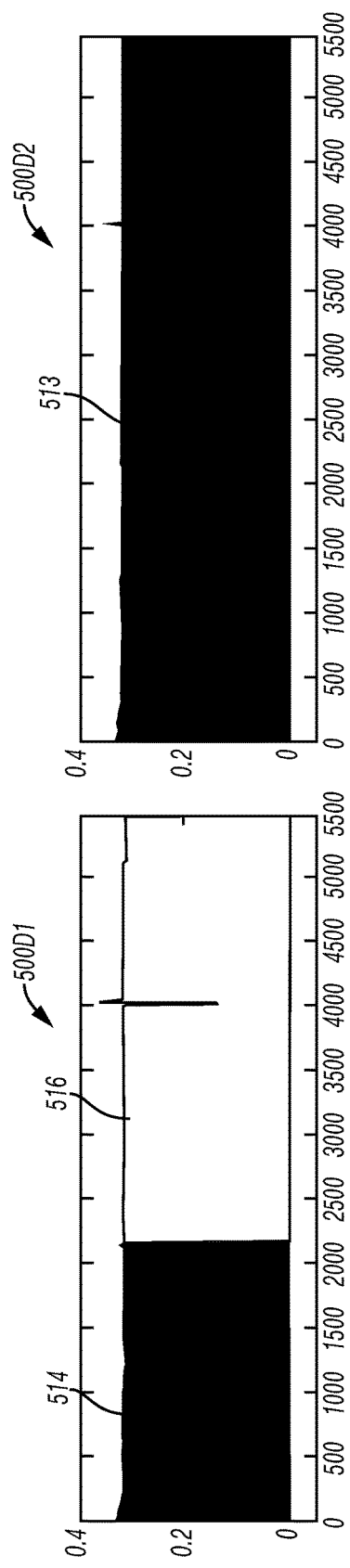
FIG. 5C2
FIG. 5D2
FIG. 5C1 - CONVENTIONAL ART
FIG. 5D1 - CONVENTIONAL ART

SYSTEM AND METHOD FOR ENHANCING HYDRAULIC FLUIDS FOR DOWN HOLE USE

DESCRIPTION OF THE RELATED ART

In the oil industry, various types of pressure compensation systems have been used to match the internal pressure of measurement devices with the pressure of the borehole environment. Such systems rely on mechanics such as a moveable piston, a collapsible bellow, or a flexible membrane in communication a fluid volume inside the tool. This fluid volume is filled with hydraulic fluid(s) that may comprise cooling fluids. As pressure on the outside of the tool increases, the mechanical compensation system will reduce the overall internal tool volume and therefore necessarily also increase the pressure. This allows the internal pressure to remain the same regardless of variations of the external pressure so long as the mechanical compensation system is free to move.

The hydraulic and/or cooling fluid that is used as part of the pressure compensation system undergoes changes in properties such as viscosity, density, and dielectric constant as pressure and temperature change. Pressure and temperature are two competing effects, meaning the most extreme changes (relative to ambient conditions) are at high pressure and low temperature or vice versa. The hydraulic or cooling liquid is more dense and viscous at high pressure and low temperature and lightest (less viscous) at low pressure and high temperature. Temperature in general has greater impact on viscosity than pressure.

For downhole environments, such as in a drilling operation, one or more sensors and/or tools may have parts that move through the hydraulic or cooling fluid. Changes to the hydraulic or cooling fluid may have a considerable impact on operations of the sensors and/or tools. Increased viscosity of the compensation hydraulic or cooling fluid may prevent moving parts from moving as intended. Increased viscosity may cause problems like reduced hydraulic flow or formation of a thicker more sticky film on the moving parts. If there are contacts with electric potential in the hydraulic or cooling fluid, the insulating capabilities between the contacts may also be altered, regardless of whether the intention is to short those contacts and pass current through them or to electrically isolate them from each other. The end result, either way, is a system which contains the changed hydraulic or cooling fluid that operates under less than optimum conditions when pressure is increased and/or temperature lowered.

SUMMARY OF THE DISCLOSURE

An enhanced hydraulic fluid comprises a conventional hydraulic fluid in combination with a predetermined amount of benzene by volume relative to the conventional hydraulic fluid. The predetermined amount of benzene preferably comprises between about 1.0% to about 20.0% benzene by volume, more preferably between about 1.5% to about 10.0% benzene by volume, and most preferably between about 2.0% to about 5.0% benzene by volume. The conventional hydraulic fluid may comprise an electronics coolant liquid or an oil.

Conventional hydraulic fluids that may be mixed with benzene according to the volumes described above include, but are not limited to, FLUORINERTS™ that include FC-43 and FC-70, including any perfluorinated, partially fluorinated, or partially chlorinated alkane with between about 3 to about 18 carbon atoms; mineral oils that include CAPELLA™ brand mineral oil; esther oils (synthetic or natural) that include formidals, and MIDEL™ brand esther oils. The enhanced mixture typically comprises a hydraulic liquid in combination with at least one alkylbenzene. Specifically, the alkylbenzene comprises an isomer selected from at least one of n-alkylbenzenes and branched isomers. Some alkylbenzenes include, but are not limited to, octylbenzenes, and butylbenzenes.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIGS. 4A-4D illustrate a pressurized container containing a hydraulic fluid;

FIG. 5A1 is a graph illustrating a plot of voltage versus time for a conventional hydraulic fluid;

FIG. 5A2 is a graph illustrating a plot of voltage versus time for an enhanced hydraulic fluid;

FIG. 5B1 is a graph illustrating a plot of electrical resistance versus time for a conventional hydraulic fluid;

FIG. 5B2 is a graph illustrating a plot of electrical resistance versus time for an enhanced hydraulic fluid;

FIG. 5C1 is a graph illustrating a plot of electrical current versus time for a conventional hydraulic fluid;

FIG. 5C2 is a graph illustrating a plot of electrical current versus time for an enhanced hydraulic fluid;

FIG. 5D1 is a graph illustrating a plot of electrical voltage versus time for a conventional hydraulic fluid;

FIG. 5D2 is a graph illustrating a plot of electrical voltage versus time for an enhanced hydraulic fluid.

DETAILED DESCRIPTION

Figure 1A:
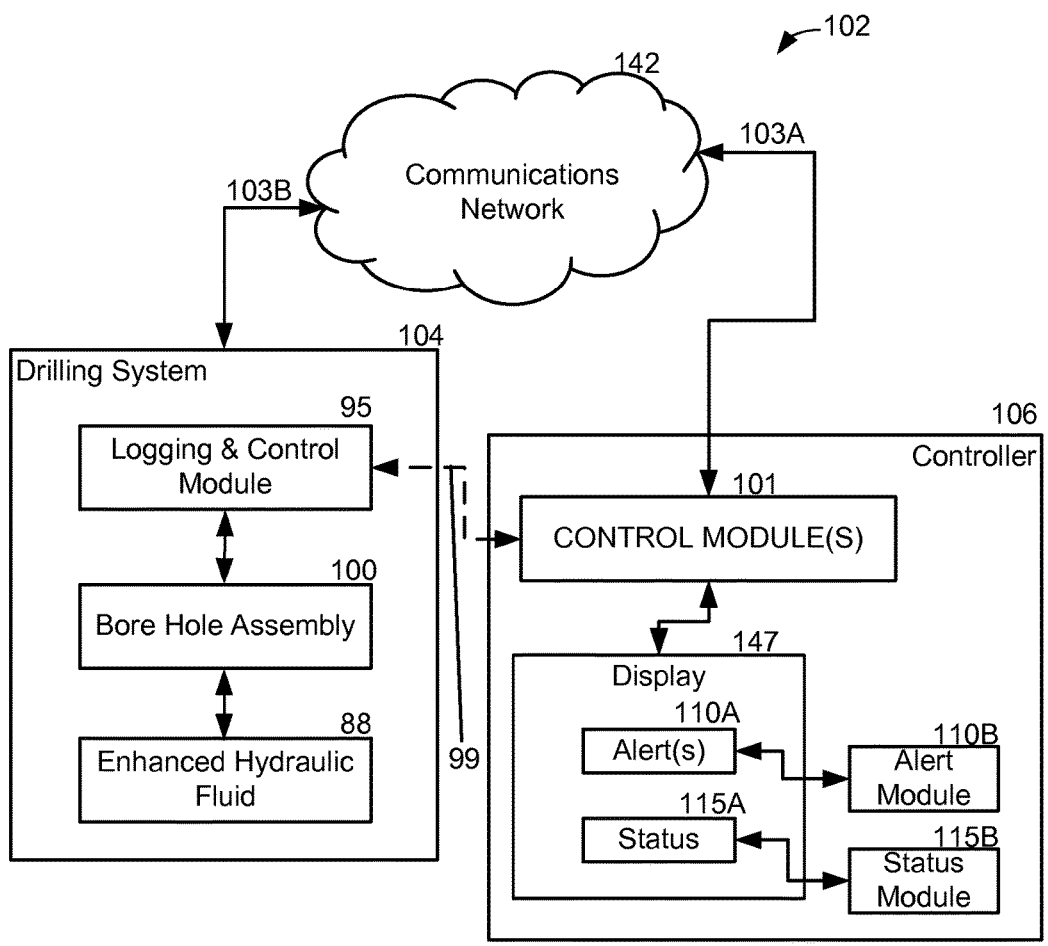
FIG. 1A is a diagram of a system for using enhanced dielectric fluids, such as an enhanced hydraulic fluid, in a drilling operation.

Referring initially to FIG. 1A, this figure is a diagram of a system 102 for controlling and monitoring a drilling operation that may employ an enhanced hydraulic fluid. The system 102 comprises a controller module 101 that is part of a controller 106. The system 102 also includes a drilling system 104 which has a logging and control module 95, a bottom hole assembly ("BHA") 100, and an enhanced hydraulic fluid 88.

The enhanced hydraulic fluid 88 may comprise a mixture of an alkyl benzene combined with a hydraulic fluid that includes, but is not limited to, synthetic or natural oils, and/or FLUORINERTS™ brand electronics coolant liquids. FLUORINERTS™ are sold commercially, as of this writing, by 3M. FLUORINERTS™ brand electronics coolant liquids are electrically insulating, stable fluorocarbon-based fluids which may be used in various cooling applications. Different molecular formulations are available with a variety of boiling points. Further details of the enhanced hydraulic fluid 88, which may comprise electronics coolant liquids, will be described below.

The controller 106 further comprises a display 147 for conveying alerts 110A and status information 115A that are produced by an alerts module 110B and a status module 115B. The controller 102 may communicate with the drilling system 104 via a communications network 142.

The controller 106 and the drilling system 104 may be coupled to the communications network 142 via communication links 103. Many of the system elements illustrated in FIG. 1A are coupled via communications links 103 to the communications network 142.

The links 103 illustrated in FIG. 1A may comprise wired or wireless couplings or links. Wireless links include, but are not limited to, radio-frequency ("RF") links, infrared links, acoustic links, and other wireless mediums. The communications network 142 may comprise a wide area network ("WAN"), a local area network ("LAN"), the Internet, a Public Switched Telephony Network ("PSTN"), a paging network, or a combination thereof. The communications network 142 may be established by broadcast RF transceiver towers (not illustrated). However, one of ordinary skill in the art recognizes that other types of communication devices besides broadcast RF transceiver towers are included within the scope of this disclosure for establishing the communications network 142.

The drilling system 104 and controller 106 of the system 102 may have RF antennas so that each element may establish wireless communication links 103 with the communications network 142 via RF transceiver towers (not illustrated). Alternatively, the controller 106 and drilling system 104 of the system 102 may be directly coupled to the communications network 142 with a wired connection. The controller 106 in some instances may communicate directly with the drilling system 104 as indicated by dashed line 99 or the controller 106 may communicate indirectly with the drilling system 104 using the communications network 142.

The controller module 101 may comprise software or hardware (or both). The controller module 101 may generate the alerts 110A that may be rendered on the display 147. The alerts 110A may be visual in nature but they may also comprise audible alerts as understood by one of ordinary skill in the art.

The display 147 may comprise a computer screen or other visual device. The display 147 may be part of a separate stand-alone portable computing device that is coupled to the logging and control module 95 of the drilling system 104. The logging and control module 95 may comprise hardware or software (or both) for direct control of a borehole assembly 100 as understood by one of ordinary skill in the art.

Figure 1B:
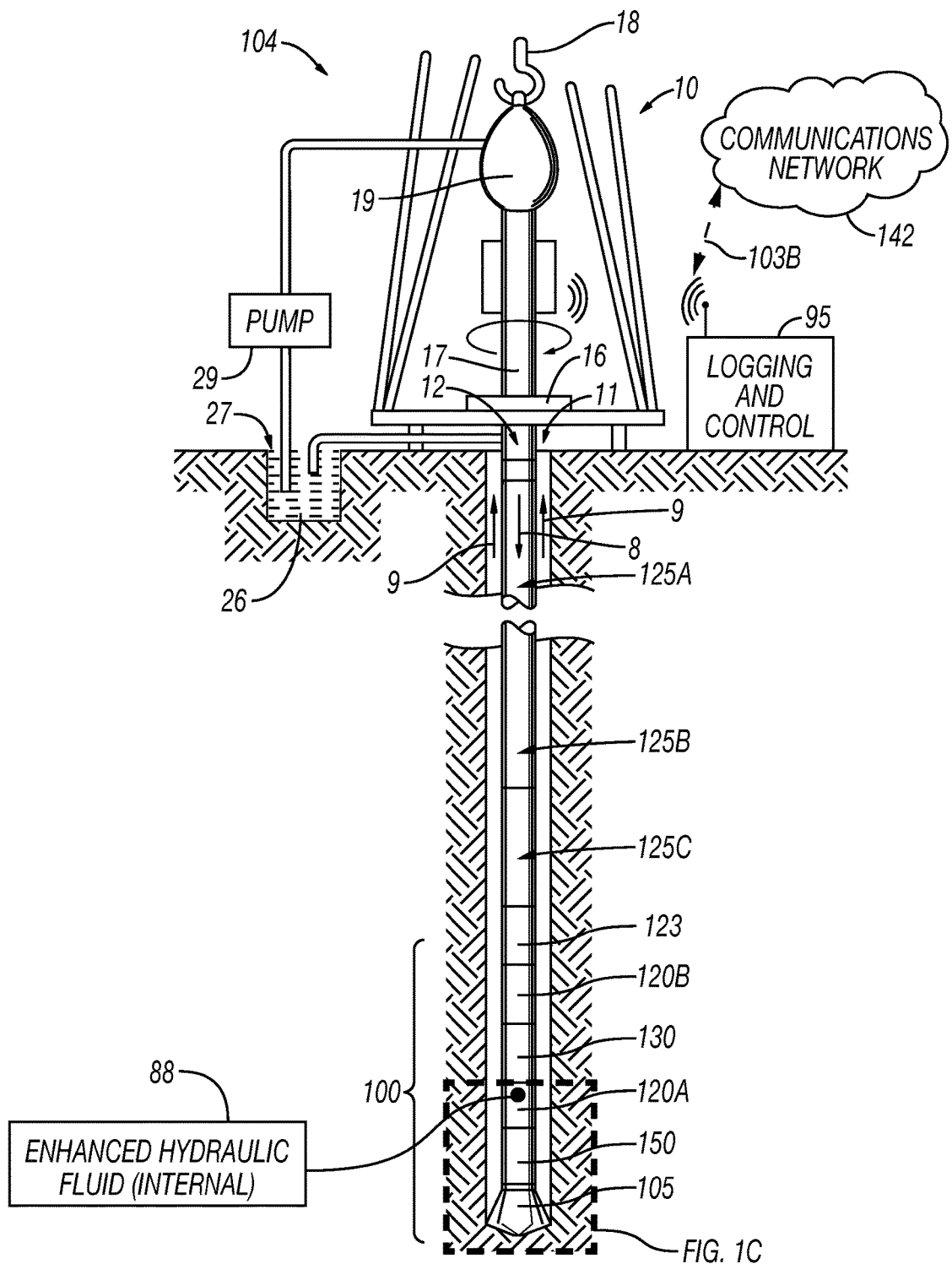
FIG. 1B is a diagram of a wellsite drilling system that forms part of the system illustrated in FIG. 1A.

FIG. 1B illustrates a wellsite drilling system 104 that forms part of the system 102 illustrated in FIG. 1A. The wellsite drilling system 104 may be onshore or offshore. In this system 104, a borehole 11 is formed in subsurface formations by rotary drilling in a manner that is known to one of ordinary skill in the art. Embodiments of the system 104 may also use directional drilling, as will be described hereinafter. The drilling system 104 comprises the logging and control module 95 as discussed above in connection with FIG. 1A.

A drill string 12 is suspended within the borehole 11 and has the bottom hole assembly ("BHA") 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is known to one of ordinary skill in the art, a top drive system could alternatively be used instead of the kelly 17 and rotary table 16 to rotate the drill string 12 from the surface. The drill string 12 may be assembled from a plurality of segments 125 of pipe and/or collars threadedly joined end to end.

In the embodiment of FIG. 1B, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports (not illustrated) in the drill bit 105, and then circulates upwardly through the annulus region between the outside of the drill string and the wall of the borehole, as indicated by the directional arrows 9. In this system as understood by one of ordinary skill in the art, the drilling fluid 26 lubricates the drill bit 105 and carries formation cuttings up to the surface as it is returned to the pit 27 for cleaning and recirculation.

The bottom hole assembly 100 of the illustrated embodiment may include a logging-while-drilling (LWD) module 120, a measuring-while-drilling (MWD) module 130, a roto-steerable system and motor 150, and drill bit 105. As described above, the enhanced hydraulic fluid 88 is used in the bottom hole assembly 100, and specifically, in the tools/modules 120, 130 in order to offset the pressure generated by the drilling fluid 26 and in order to compensate for any heat generated by the drill bit 105. As pressure on the outside of the tools/modules 120, 130 increases, a mechanical pressure compensation system 177 (See FIG. 1C) may reduce the overall internal tool volume and therefore necessarily also increase the pressure. This allows the internal pressure within the tools/modules 120, 130 to remain the same regardless of variations of the external pressure so long as the mechanical compensation system 177 is free to move.

The LWD module 120 is housed in a special type of drill collar, as is known to one of ordinary skill in the art, and can contain one or a plurality of known types of logging tools. It will also be understood that more than one LWD 120 and/or MWD module 130 can be employed, e.g. as represented at 120A. (References, throughout, to a module at the position of 120A can alternatively mean a module at the position of 120B as well). The LWD module 120 includes capabilities for measuring, processing, and storing information, as well as for communicating with the surface equipment. In the present embodiment, the LWD module 120 includes a directional resistivity measuring device.

The MWD module 130 is also housed in a special type of drill collar, as is known to one of ordinary skill in the art, and can contain one or more devices for measuring characteristics of the drill string 12 and drill bit 105. The MWD module 130 may further includes an apparatus (not shown) for generating electrical power to the downhole system 100.

This apparatus may typically include a mud turbine generator powered by the flow of the drilling fluid 26, it being understood by one of ordinary skill in the art that other power and/or battery systems may be employed. In the embodiment, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

The foregoing examples of wireline and drill string conveyance of a well logging instrument are not to be construed as a limitation on the types of conveyance that may be used for the well logging instrument. Any other conveyance known to one of ordinary skill in the art may be used, including without limitation, slickline (solid wire cable), coiled tubing, well tractor and production tubing.

Figure 1C:
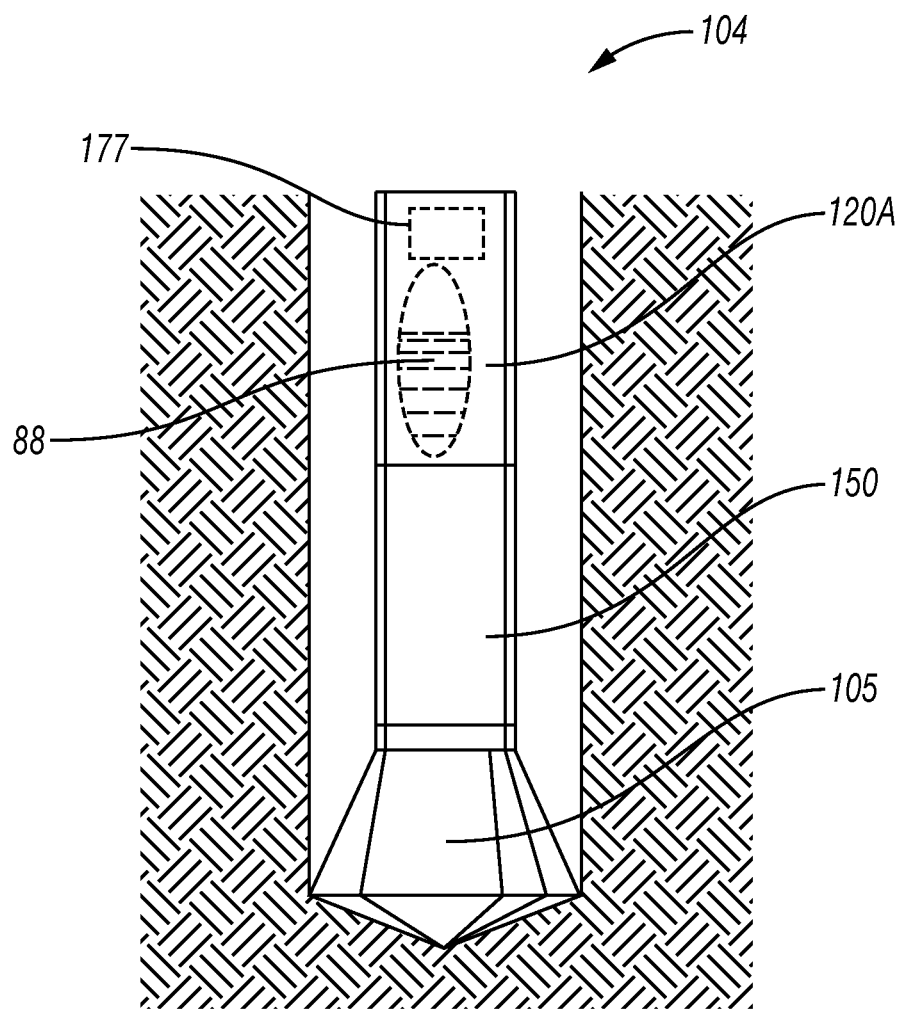
FIG. 1C is a diagram of an enlarged view of the directional deep-reading logging-while-drilling ("LWD") drilling tool that is part of the wellsite drilling system of FIG. 1B.

FIG. 1C is a diagram of an enlarged view of the directional deep-reading logging-while-drilling ("LWD") tool 120A coupled to the motor 150 and drill bit 105 that are part of the wellsite drilling system 104 of FIG. 1B. This figure provides a cut-away view of the LWD tool 120A that illustrates the enhanced hydraulic fluid 88 contained within LWD tool 120A. The hydraulic fluid 88 may be in fluid communication with the mechanical pressure compensation system 177.

As mentioned above, the mechanical pressure compensation system 177 may reduce the overall internal volume of the LWD tool 120A and therefore necessarily also increase the pressure within the internal volume of the LWD tool 120A. The increase of pressure to the enhanced hydraulic fluid allows the internal pressure within the tools/modules 120, 130 to remain substantially the same relative to the areas external to the tools/modules regardless of variations of the external pressure, such as caused by the drilling fluid 26 and/or the drill bit 105, so long as the mechanical compensation system 177 is free to move.

Pressures external to the drill bit 105 and LWD tool 120A might vary from about 100 pounds per square inch ("psi") to about 100,000 psi. Currently oil wells with formation pressures up to about 30,000 psi are drilled. It is expected that this boundary for pressure may be pushed further in the future. Temperatures external to the drill bit 105 and LWD tool 120A may vary from about 5 C. to about 300 C. Currently, as of this writing, it is rare that temperature of an bore hole 11 is higher than 180 C., however, it is expected that this limit may be further pushed in the future.

The enhanced hydraulic fluid 88 may comprise a mixture of an alkyl benzene combined with a hydraulic fluid that includes, but is not limited to, synthetic or natural oils, and/or electronic cooling liquids, such as FLUORINERTS™ brand electronics coolant liquid sold commercially, as of this writing by 3M™.

3M™ FLUORINERT™ liquids are a family of clear, colorless, odorless, perfluorinated fluids having a viscosity equivalent to water but approximately 75% greater density. These products are thermally and chemically stable, compatible with sensitive materials, including metals, plastics and elastomers, non-flammable and practically non-toxic. The dielectric strength of perfluorinated liquids is high—in excess of about 35,000 volts across about a 0.1 inch gap. Water solubility is on the order of about few parts per million. Fluorinert liquids are available with boiling points ranging from about 30° C. to about 215° C., and pour points as low as about −101° C.

The enhanced hydraulic fluid 88 has a lower viscosity and lower electrical resistance compared to conventional hydraulic/coolant fluids operating at the same conditions in a drilling context. Further details of this enhanced hydraulic fluid 88 will be described below.

Preparations of the Enhanced Hydraulic Fluid 88

The mixing of the alkyl benzenes with conventional hydraulic liquids occurred at standard temperature and pressure ("STP") as understood by one of ordinary skill the art. Room temperature was between about 75.0 to about 78.0° F. Testing occurred within a climate controlled space of a building such that relative humidity was approximately 40% or below.

The volume percentage of the benzenes which were tested with the hydraulic liquids were as follows: 2%, 5%, 8%, 10%, 15%, and 20%. For some mixtures, the benzenes were mixed into the hydraulic fluids with a handheld, plastic stirrer at approximately about 10.0 revolutions per minute (r.p.m). The mixtures were contained within 1.5 Liter sized glass beakers. Other mixtures were agitated using an automated mixer such as between about 20 rpm to about 50 RPM.

The mixing was conducted over several minutes on the order of about 1.0 to about 5.0 minutes. One of ordinary skill the art will recognize that other mechanical and/or automated agitation and other magnitudes of revolutions per minute (r.p.m.) for the mixing of the two fluids may be employed without departing from the scope of the inventive system. Each of the mixtures resulting in the enhanced hydraulic fluid 88 was usually allowed to rest for about approximately an hour while other tests were conducted. The resting of the agitated mixtures forming the enhanced hydraulic fluids 88 was not done purposely but it was noted that this resting of the mixtures did occur.

Testing was performed to determine what minimal percentage of octyl or butyl benzenes may be added to a conventional hydraulic fluid while gaining the most benefits in terms of lowering viscosity and improving switching speed of mechanical relays and solenoids which are immersed in such a fluid. Benzenes are currently very costly as of this writing and further, some benzenes may also pose a health risk in some situations as understood by one of ordinary skill in the art.

Testing of Enhanced Hydraulic Fluid 88

Figure 1D:
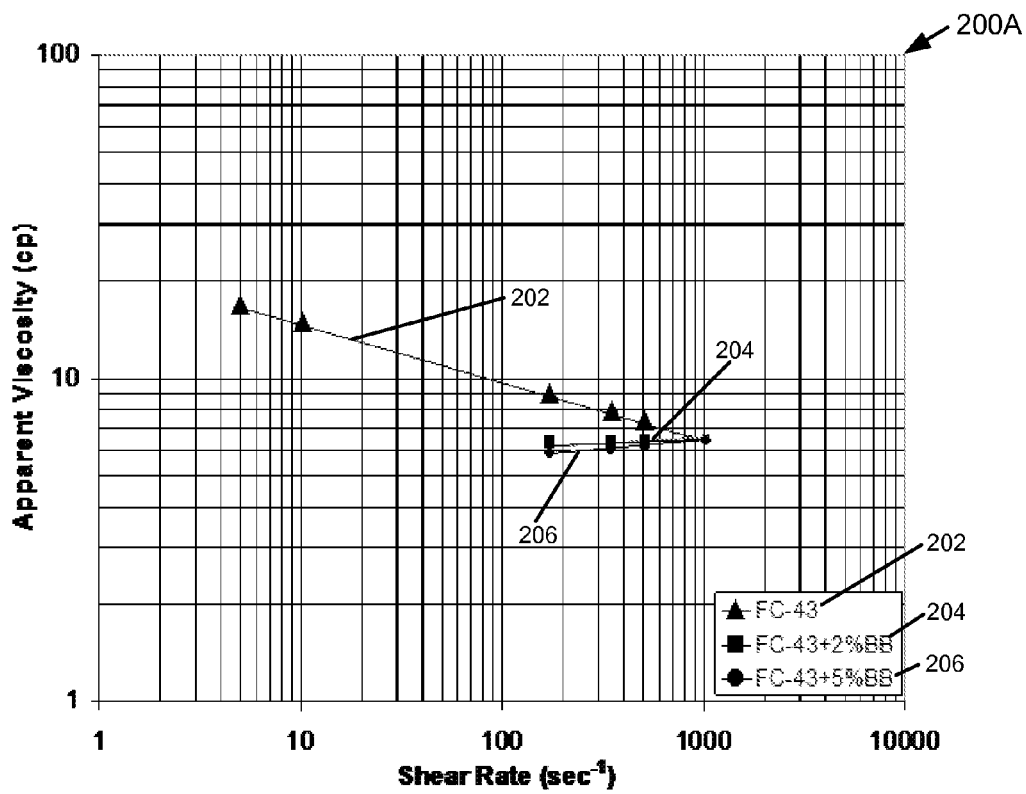
FIG. 1D is a graph illustrating a plot of apparent viscosity versus shear rate for a conventional hydraulic fluid and two enhanced hydraulic fluids.

FIG. 1D is a graph 200A illustrating a plot of apparent viscosity (in centipoise on the Y-axis) versus shear rate (in $\sec^{-1}$ on the X-axis) for a conventional hydraulic fluid and two enhanced hydraulic fluids 88. The results for the conventional hydraulic fluid are tracked by line 202 while the results for the two enhanced hydraulic fluids 88 are tracked by lines 204 and 206.

The results plotted in graph 200A as well as the remaining graphs 200B-200F were generated by a testing standard: American Society for Testing and Materials (ASTM) D2196. ASTM D2196 provides Test Methods for Rheological Properties of Non-Newtonian Materials by a Rotational (Brookfield type) Viscometer. A GRACE™ brand M2500 rheometer was used to conduct these tests. As understood by one of ordinary skill in the art ASTM D2196 covers the determination of the apparent viscosity and the shear thinning and thixotropic properties of non-Newtonian materials in the shear rate range from about 0.1 to about 50.0 sec$^{-1}$.

The conventional hydraulic fluid tracked by line 202 of FIG. 1D comprised a FLUORINERTS™ brand electronics coolant liquid, and specifically, Fluorocarbon (FC)-43. 3M™ FLUORINERT™ brand Electronic Liquid FC-43 comprises a clear, colorless, fully-fluorinated liquid. The liquid is thermally and chemically stable, compatible with sensitive materials, nonflammable, practically nontoxic and leaves essentially no residue upon evaporation. The liquid has a boiling point of about 174° C. (at 1 atm).

Meanwhile, the first enhanced hydraulic fluid 88 tracked by line 204 comprised electronics cooling liquid FC-43 described above in combination with 2% (by volume) of an alkyl benzene, and specifically, butylbenzene ("BB"). The second enhanced hydraulic fluid 88 tracked by line 206 comprised electronics cooling liquid FC-43 described above in combination with 5% (by volume) of an alkyl benzene, and specifically, butylbenzene ("BB").

Line 202 of graph 200A demonstrates how the control hydraulic fluid was tested between the shear rate range of about 5 sec-1 to about 1000 sec-1. Meanwhile, line 204 demonstrates how the hydraulic fluid comprising the 2% butylbenzene by volume was tested over a shorter shear rate range of between about 101 sec-1 to about 1000 sec-1. Line 206 demonstrates how the hydraulic fluid comprising the 5% butylbenzene was also tested over a shorter shear rate range relative to the control hydraulic fluid at between about 101 sec-1 to about 1000 sec-1.

One reason why the two enhanced hydraulic fluids 88 comprising the benzenes plotted in graph 200A were not tested over the same range as the control hydraulic fluid was due to a change in the character of the enhanced hydraulic fluid 88 as the butylbenzene was added.

Specifically, the shear rate ranges surveyed for the three fluids tested in graph 200A do not overlap completely because the base cooling fluid of FC-43 (line 202 in FIG. 1D) displayed non-Newtonian behavior (i.e. the viscosity observed depended on shear rate) but the enhanced hydraulic fluids 88 comprising benzene displayed Newtonian behavior. In such a cooling fluid as FC-43, as understood by one of ordinary skill in the art, it is expected that the non-Newtonian behavior confers a higher zero-shear and low-shear viscosity on the fluid, which means the local rate of diffusion for any particle or species in the fluid will be much slower under low shear or zero shear conditions than it would be if the fluid were moving or the particle were moving in the fluid.

The addition of butylbenzene in the enhanced hydraulic fluids 88 (represented by lines 204 and 206 of Graph 200A) converts the fluid to Newtonian—a hallmark of Newtonian behavior is the independence of viscosity on shear rate.

In the enhanced hydraulic fluids 88 represented by lines 204 and 206, the slopes of the lines in plot 200A are essentially zero. Confronted with several identical measurements as shear rate was reduced, it was concluded that these enhanced hydraulic fluids 88 were Newtonian and ceased measurement, having gathered evidence for substantial reduction in low- and zero-shear viscosity.

However, comparing the shear rate range that is common to all three hydraulic fluids which were tested as illustrated in FIG. 1D (which is between about 100.8 sec-1 to about 1000.0 sec-1), a decrease in apparent viscosity of the two enhanced hydraulic fluids 88 is significant. For line 202, the apparent viscosity for this common shear rate range is between about 9.0 cp to about 5.5 cp. For line 204 that is a plot of the results for the 2% benzene mixture, the apparent viscosity for this shared shear rate range is between about 5.0 cp to about 5.5 cp. For line 206 that plots the results for the 2% benzene mixture, the apparent viscosity for this common shear rate range is between about 5.0 cp to about 5.5 cp.

Lines 204 and 206 for the enhanced hydraulic fluids 88 have apparent viscosities across the shared shear rate range (between about 100.8 sec-1 to about 1000.0 sec-1) that closely tracked one another. This means the apparent viscosities for these two enhanced hydraulic fluids 88 were very close to each other, with the apparent viscosity values for the FC-43 with 2% butylbenzene (line 204) being slightly higher than the FC-43 with 5% butylbenzene (line 206). However, the apparent viscosities for both of these enhanced hydraulic fluids 88 were significantly lower than that of the conventional hydraulic fluid tracked by line 202.

Line 202 representing the conventional hydraulic fluid demonstrated a decreasing slope in apparent viscosity across the shared shear rate range, while lines 204 and 206 representing the enhanced hydraulic fluids 88 demonstrated an increasing slope in apparent viscosity across the shared shear rate range. However, the apparent viscosity values for both enhanced hydraulic fluids 88 were always lower in value relative to the viscosity values for the conventional hydraulic fluid across the shared shear rate range.

Figure 1E:
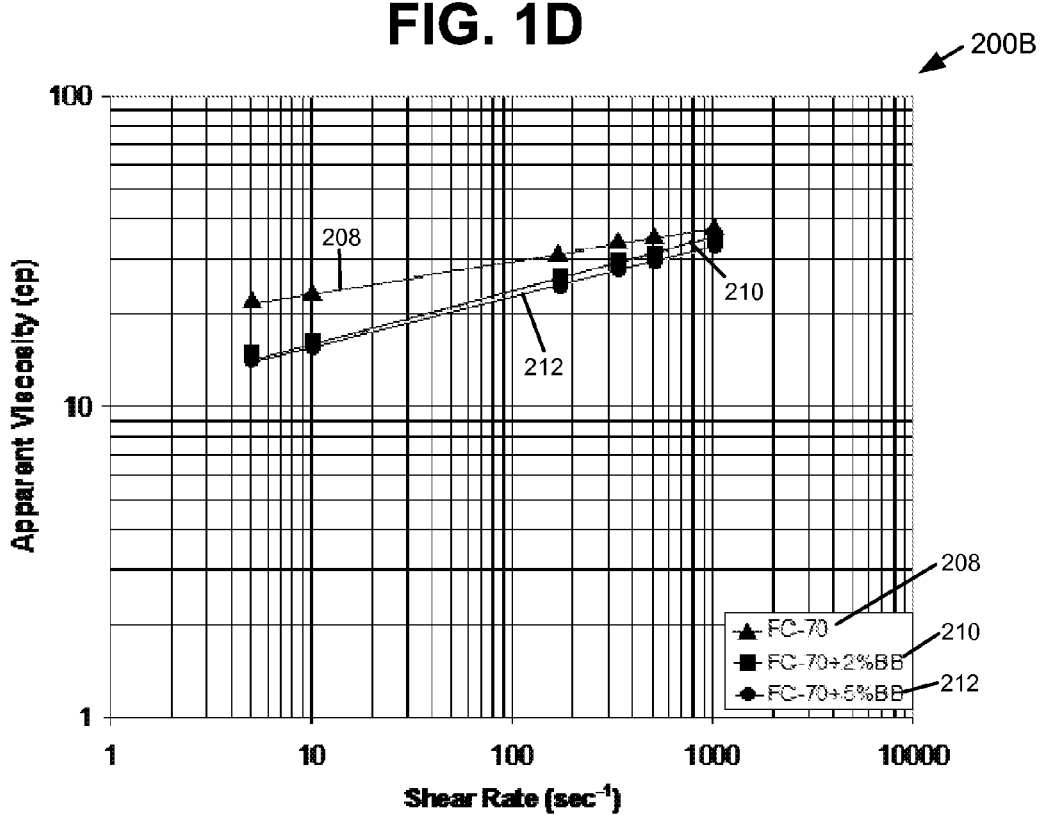
FIG. 1E is another graph illustrating a plot of apparent viscosity versus shear rate for a conventional hydraulic fluid and two enhanced hydraulic fluids.

FIG. 1E is a graph 200B illustrating a plot of apparent viscosity (in centipoise on the Y-axis) versus shear rate (in sec$^{-1}$ on the X-axis) for a conventional hydraulic fluid and two enhanced hydraulic fluids 88. The results for the conventional hydraulic fluid are tracked by line 208 while the results for the two enhanced hydraulic fluids 88 are tracked by lines 210 and 212.

The conventional hydraulic fluid tracked by line 208 of FIG. 1E comprised a FLUORINERTS™ brand electronics coolant liquid, and specifically, Fluorocarbon (FC)-70 also known as Perfluorotripentylamine 3M™ FLUORINERT™ brand Electronic Liquid FC-70 comprises a clear, colorless, fully-fluorinated liquid. The liquid is thermally and chemically stable, compatible with sensitive materials, nonflammable, practically nontoxic and leaves essentially no residue upon evaporation. The liquid has a boiling point of about 215° C. (at 1 atm).

Meanwhile, the first enhanced hydraulic fluid tracked by line 210 comprised electronics cooling liquid FC-70 described above in combination with 2% (by volume) of an alkyl benzene, and specifically, butylbenzene ("BB"). The second enhanced hydraulic fluid 88 tracked by line 212 comprised electronics cooling liquid FC-70 described above in combination with 5% (by volume) of an alkyl benzene, and specifically, butylbenzene ("BB").

All three lines 208, 210, 212 of graph 200B demonstrate how the hydraulic fluids were tested between the shear rate range of about 5.0 sec-1 to about 1000.0 sec-1. Over this shear rate range, the apparent viscosity for the control hydraulic fluid containing no benzene tracked by line 208 ranged between about 11.2 cp to about 12.8 cp. Meanwhile, over the same shear rate range, the apparent viscosity for the first enhanced hydraulic fluid 88 having 2% of an alkylbenzene tracked by line 210 ranged between about 10.6 cp to about 12.5 cp. And the apparent viscosity for the second enhanced hydraulic fluid 88 having 5% of an alkylbenzene tracked by line 212 ranged between about 10.5 cp to about 12.4 cp, which was slightly lower relative to the first enhanced hydraulic fluid 88 tracked by line 210. All three hydraulic fluids represented by lines 208, 210, and 212 demonstrated an increase in slope in apparent viscosity across this shear rate range.

Figure 2A:
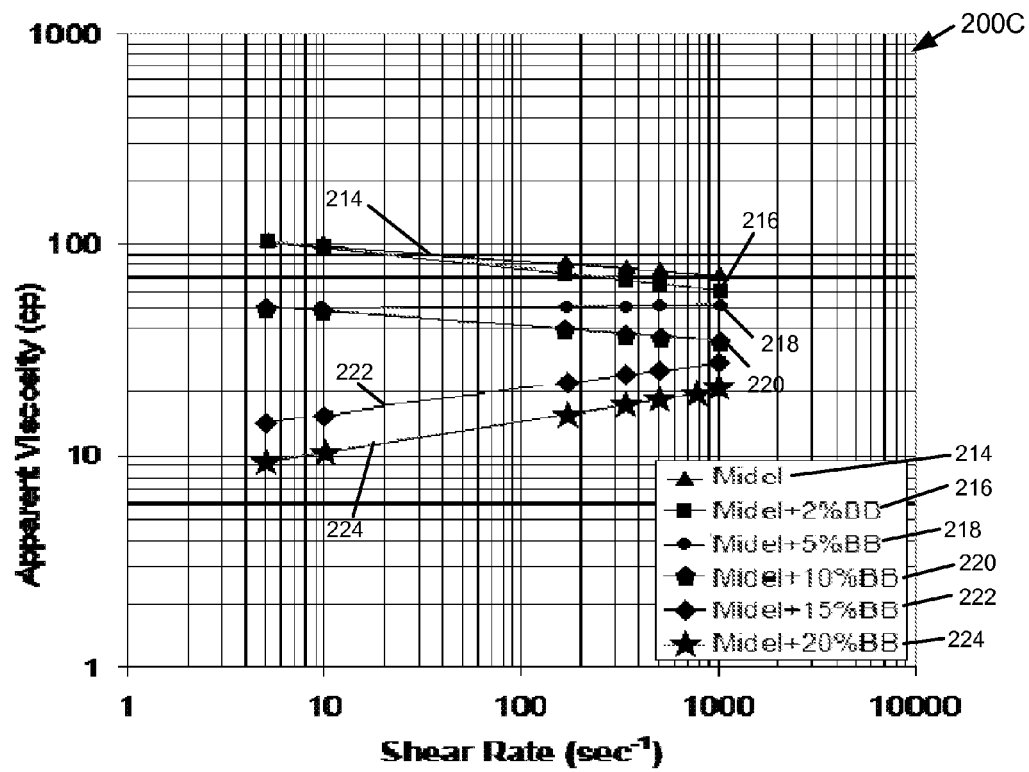
FIG. 2A is a graph illustrating a plot of apparent viscosity versus shear rate for a conventional hydraulic fluid and five enhanced hydraulic fluids.

FIG. 2A is a graph 200C illustrating a plot of apparent viscosity (in centipoise on the Y-axis) versus shear rate (in $sec^{-1}$ on the X-axis) for a conventional hydraulic fluid and five enhanced hydraulic fluids 88. The results for the conventional hydraulic fluid are tracked by line 214 while the results for the five enhanced hydraulic fluids 88 are tracked by lines 216-224.

The conventional hydraulic fluid tracked by line 214 of FIG. 2A comprised MIDEL™ brand ester oil, sold by M&I Materials Ltd of Great Britain. Specifically, MIDEL™ 7131 brand ester oil was used and it comprises a synthetic ester-based dielectric fluid. It has a flashpoint of about 260° C. (ISO 2719), a firepoint of about 316° C. (ISO 2592), and a pour point of −60° C. (ISO 3016). The oil also has a volume resistivity in DC at 90° C. of about 30.0 Gohm-m or greater (IEC 60247).

Meanwhile, the first enhanced hydraulic fluid 88 tracked by line 216 comprised MIDEL™ 7131 brand ester oil described above in combination with 2% (by volume) of an alkyl benzene, and specifically, butylbenzene ("BB"). The second enhanced hydraulic fluid 88 tracked by line 218 comprised MIDEL™ 7131 brand oil described above in combination with 5% (by volume) of an alkyl benzene, and specifically, butylbenzene ("BB"). The third enhanced hydraulic fluid 88 tracked by line 220 comprised MIDEL™ 7131 brand oil described above in combination with 10% (by volume) of an alkyl benzene, and specifically, butylbenzene ("BB").

The fourth enhanced hydraulic fluid 88 tracked by line 222 comprised MIDEL™ 7131 brand oil described above in combination with 15% (by volume) of an alkyl benzene, and specifically, butylbenzene ("BB"). The fifth enhanced hydraulic fluid 88 tracked by line 224 comprised MIDEL™ 7131 brand oil described above in combination with 20% (by volume) of an alkyl benzene, and specifically, butylbenzene ("BB").

All six lines 214-224 of graph 200C demonstrate how the hydraulic fluids were tested between the shear rate range of about 5.0 sec-1 to about 1000.0 sec-1. Over this shear rate range, the apparent viscosity for the control hydraulic fluid containing no benzene tracked by line 214 ranged between about 100.0 cp to about 70.0 cp. Meanwhile, over the same shear rate range, the apparent viscosity for the first enhanced hydraulic fluid 88 having 2% of an alkylbenzene tracked by line 216 ranged between about 100.0 cp to about 61.0 cp. And the apparent viscosity for the second enhanced hydraulic fluid 88 having 5% of an alkylbenzene tracked by line 218 ranged between about 50.0 cp to about 51.0 cp.

The apparent viscosity for the third enhanced hydraulic fluid 88 having 10% of an alkylbenzene tracked by line 220 ranged between about 51.0 cp to about 35.0 cp. The apparent viscosity for the fourth enhanced hydraulic fluid 88 having 15% of an alkylbenzene tracked by line 222 ranged between about 16.0 cp to about 28.0 cp. The apparent viscosity for the fifth enhanced hydraulic fluid 88 having 20% of an alkylbenzene tracked by line 224 ranged between about 9.5 cp to about 21.0 cp.

The conventional hydraulic fluid tracked by line 214 and the first enhanced hydraulic fluid 88 tracked by line 216 and the third enhanced hydraulic fluid 88 tracked by line 220 generally demonstrated a decrease in slope for apparent viscosity across the shared shear rate range. Meanwhile, there was relatively little or no change in slope for apparent viscosity for the second enhanced hydraulic fluid 88 tracked by line 218 (5% benzene) across the shared shear rate range. The fourth enhanced hydraulic fluid 88 tracked by line 222 and the fifth enhanced hydraulic fluid 88 tracked by line 224 demonstrated an increase in slope for apparent viscosity across the shared shear rate range.

Figure 2B:
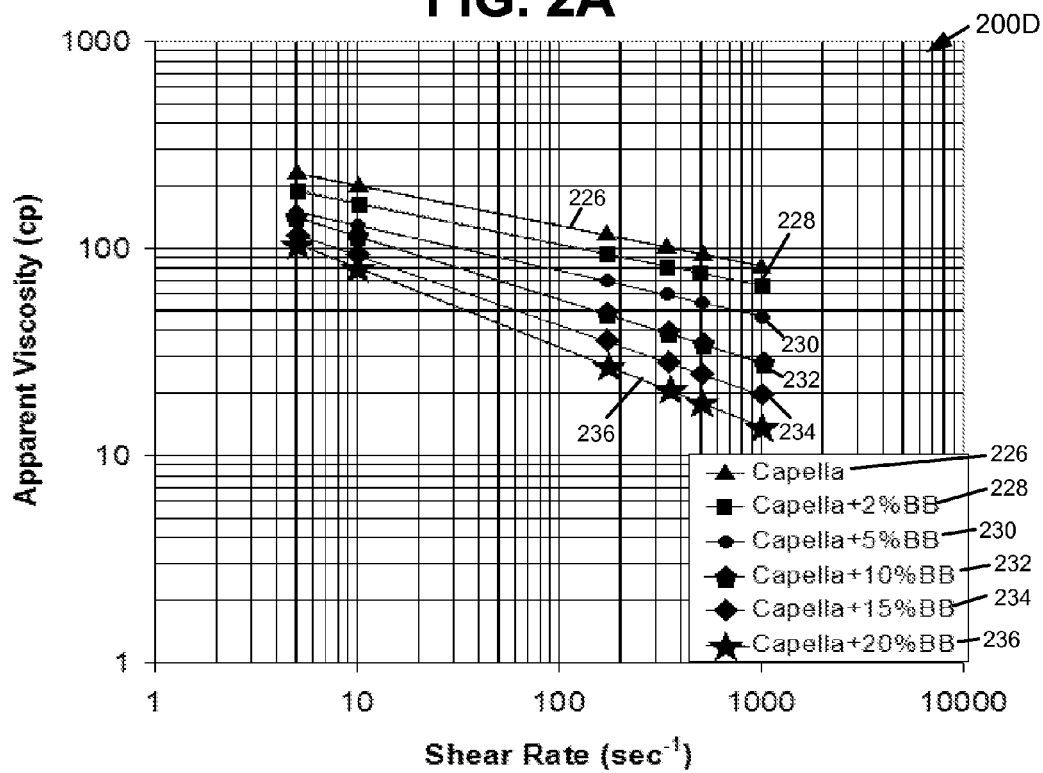
FIG. 2B is a graph illustrating a plot of apparent viscosity versus shear rate for a conventional hydraulic fluid and five enhanced hydraulic fluids.

FIG. 2B is a graph 200D illustrating a plot of apparent viscosity (in centipoise on the Y-axis) versus shear rate (in $sec^{-1}$ on the X-axis) for a conventional hydraulic fluid and five enhanced hydraulic fluids 88. The results for the conventional hydraulic fluid are tracked by line 226 while the results for the five enhanced hydraulic fluids 88 are tracked by lines 228-236.

The conventional hydraulic fluid tracked by line 226 of FIG. 2C comprised CAPELLA™ brand mineral oil, sold as of this writing by CHEVRON™ oil company. Specifically, CAPELLA™ WF 32 brand mineral oil was used and it comprises mineral oil recommended for use in refrigeration compressor systems. CAPELLA™ brand of mineral oil is manufactured using specially refined naphthenic mineral oils, assuring low pour points necessary for refrigeration compressor lubricants. CAPELLA™ WF 32 brand mineral oil has a flashpoint of about 168° C., a pour point of about −40° C., and a dielectric strength of about 30.0 or greater kV (ASTM D877).

Meanwhile, the first enhanced hydraulic fluid 88 tracked by line 226 comprised CAPELLA™ WF 32 brand mineral described above in combination with 2% (by volume) of an alkyl benzene, and specifically, butylbenzene ("BB"). The second enhanced hydraulic fluid 88 tracked by line 230 comprised CAPELLA™ WF 32 brand mineral oil described above in combination with 5% (by volume) of an alkyl benzene, and specifically, butylbenzene ("BB"). The third enhanced hydraulic fluid 88 tracked by line 232 comprised CAPELLA™ WF 32 brand mineral oil described above in combination with 10% (by volume) of an alkyl benzene, and specifically, butylbenzene ("BB").

The fourth enhanced hydraulic fluid 88 tracked by line 234 comprised CAPELLA™ WF 32 brand mineral oil described above in combination with 15% (by volume) of an alkyl benzene, and specifically, butylbenzene ("BB"). The fifth enhanced hydraulic fluid 88 tracked by line 226 comprised CAPELLA™ WF 32 brand mineral oil described above in combination with 20% (by volume) of an alkyl benzene, and specifically, butylbenzene ("BB").

All six lines 226-236 of graph 200D demonstrate how the hydraulic fluids were tested between the shear rate range of about 5.0 sec-1 to about 1000.0 sec-1. Over this shear rate range, the apparent viscosity for the control hydraulic fluid containing no benzene tracked by line 226 ranged between about 240.0 cp to about 81.0 cp. Meanwhile, over the same shear rate range, the apparent viscosity for the first enhanced hydraulic fluid 88 having 2% of an alkylbenzene tracked by line 228 ranged between about 199.0 cp to about 50.0 cp. And the apparent viscosity for the second enhanced hydraulic fluid 88 having 5% of an alkylbenzene tracked by line 230 ranged between about 160.0 cp to about 48.0 cp.

The apparent viscosity for the third enhanced hydraulic fluid 88 having 10% of an alkylbenzene tracked by line 232 ranged between about 150.0 cp to about 28.0 cp. The apparent viscosity for the fourth enhanced hydraulic fluid 88 having 15% of an alkylbenzene tracked by line 234 ranged between about 120.0 cp to about 11.0 cp. The apparent viscosity for the fifth enhanced hydraulic fluid 88 having 20% of an alkylbenzene tracked by line 236 ranged between about 100.0 cp to about 5.0 cp.

All six fluids tracked by lines 226-236 generally demonstrated a decrease in slope for apparent viscosity across the shared shear rate range of about 5.0 sec-1 to about 1000.0 sec-1. However, each enhanced hydraulic fluid 88 having a greater percentage of benzene by volume had much lower viscosity ranges. These lower viscosity ranges for the enhanced hydraulic fluids 88 tracked by lines 228-236 occur in a progressive manner as the volume of benzene increases, compared to the conventional hydraulic fluid having no benzene tracked by line 226.

Figure 3A:
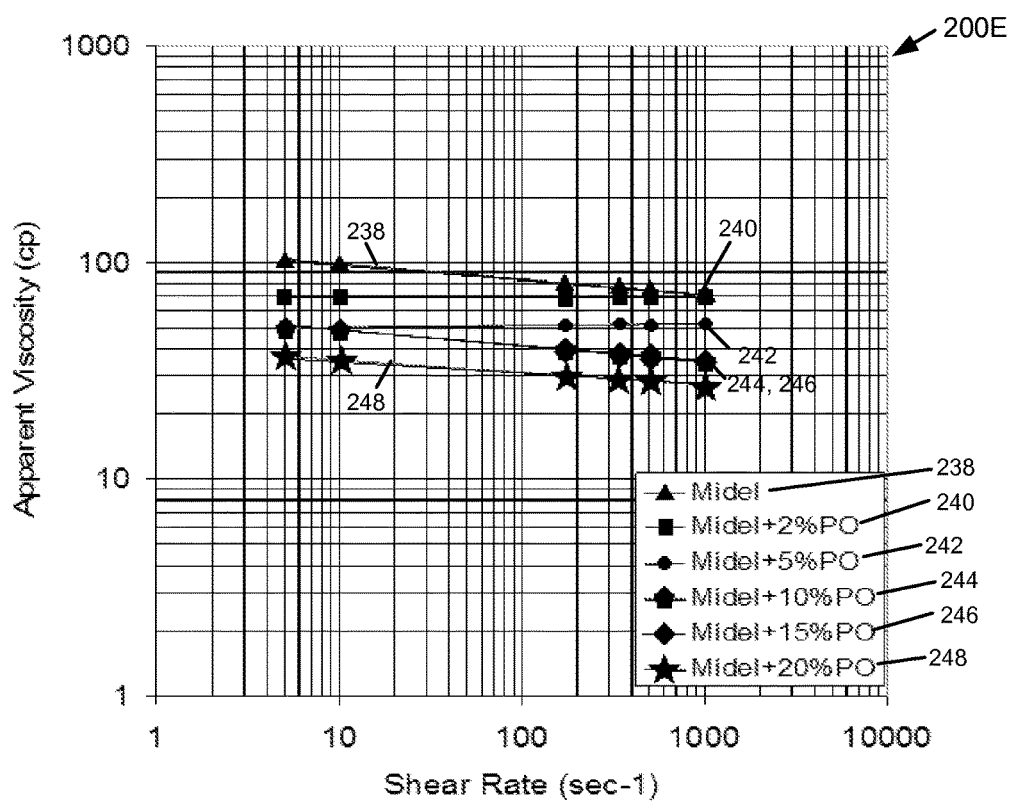
FIG. 3A is a graph illustrating a plot of apparent viscosity versus shear rate for a conventional hydraulic fluid and five enhanced hydraulic fluids.

FIG. 3A is a graph 200E illustrating a plot of apparent viscosity (in centipoise on the Y-axis) versus shear rate (in $\sec^{-1}$ on the X-axis) for a conventional hydraulic fluid and five enhanced hydraulic fluids 88. The results for the conventional hydraulic fluid are tracked by line 238 while the results for the five enhanced hydraulic fluids 88 are tracked by lines 240-248.

The conventional hydraulic fluid tracked by line 238 of FIG. 3A comprised MIDEL™ brand ester oil, sold by M&I Materials Ltd of Great Britain, described above in connection with FIG. 2A. Meanwhile, the first enhanced hydraulic fluid 88 tracked by line 240 comprised MIDEL™ brand ester oil described above in combination with 2% (by volume) of an alkyl benzene, and specifically, Phenyl Octane ("PO"), also known as Octyl benzene. The second enhanced hydraulic fluid 88 tracked by line 242 comprised MIDEL™ brand ester oil described above in combination with 5% (by volume) of an alkyl benzene, and specifically, Phenyl Octane ("PO"), also known as Octyl benzene.

The third enhanced hydraulic fluid 88 tracked by line 244 comprised MIDEL™ brand ester oil described above in combination with 10% (by volume) of an alkyl benzene, and specifically, Phenyl Octane ("PO"), also known as Octyl benzene. The fourth enhanced hydraulic fluid 88 tracked by line 246 comprised MIDEL™ brand ester oil described above in combination with 15% (by volume) of an alkyl benzene, and specifically, Phenyl Octane ("PO"), also known as Octyl benzene. The fifth enhanced hydraulic fluid 88 tracked by line 248 comprised MIDEL™ brand ester oil described above in combination with 20% (by volume) of an alkyl benzene, and specifically, Phenyl Octane ("PO"), also known as Octyl benzene.

All six lines 238-248 of graph 200E demonstrate how the hydraulic fluids were tested between the shear rate range of about 5.0 sec-1 to about 1000.0 sec-1. Over this shear rate range, the apparent viscosity for the control hydraulic fluid containing no benzene tracked by line 238 ranged between about 101.0 cp to about 70.0 cp. Meanwhile, over the same shear rate range, the apparent viscosity for the first enhanced hydraulic fluid 88 having 2% of an alkylbenzene tracked by line 240 ranged between about 70.0 cp to about 70.0 cp (essentially flat). And the apparent viscosity for the second enhanced hydraulic fluid 88 having 5% of an alkylbenzene tracked by line 242 ranged between about 50.0 cp to about 51.0 cp.

The apparent viscosity for the third enhanced hydraulic fluid 88 having 10% of an alkylbenzene tracked by line 244 ranged between about 55.0 cp to about 35.0 cp. The apparent viscosity for the fourth enhanced hydraulic fluid 88 having 15% of an alkylbenzene tracked line 256 was about the same as the third enhanced hydraulic fluid 88: between about 50.0 cp to about 35.0 cp. The apparent viscosity for the fifth enhanced hydraulic fluid 88 having 20% of an alkylbenzene tracked by line 248 ranged between about 38.0 cp to about 28.0 cp.

The conventional hydraulic fluid tracked by line 238, and the third through fifth enhanced hydraulic fluids 88 (10%-20% benzene) tracked by lines 244-248 generally demonstrated a decrease in slope for apparent viscosity across the shared shear rate range. Meanwhile, there was relatively little or no change in slope for apparent viscosity for the first enhanced hydraulic fluid 88 tracked by line 240 (2% benzene) and the second enhanced hydraulic fluid 88 (5% benzene) tracked by line 242 across the shared shear rate range.

Figure 3B:
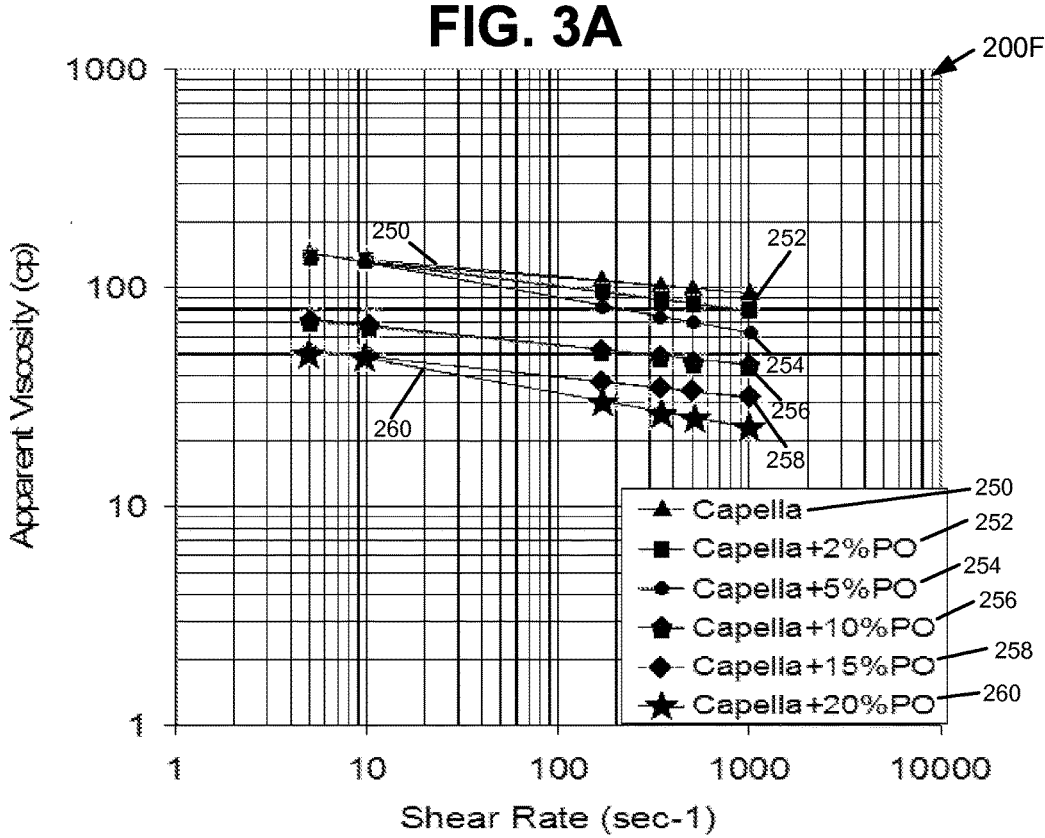
FIG. 3B is a graph illustrating a plot of apparent viscosity versus shear rate for a conventional hydraulic fluid and five enhanced hydraulic fluids.

FIG. 3B is a graph 200F illustrating a plot of apparent viscosity (in centipoise on the Y-axis) versus shear rate (in $\sec^{-1}$ on the X-axis) for a conventional hydraulic fluid and five enhanced hydraulic fluids 88. The results for the conventional hydraulic fluid are tracked by line 250 while the results for the five enhanced hydraulic fluids 88 are tracked by lines 252-260.

The conventional hydraulic fluid tracked by line 250 of FIG. 3B comprised CAPELLA™ brand mineral oil, sold as of this writing by CHEVRON™ oil company. Specifically, CAPELLA™ WF 32 brand mineral oil was used as described above in connection with FIG. 2B.

Meanwhile, the first enhanced hydraulic fluid 88 tracked by line 252 comprised CAPELLA™ WF 32 brand mineral oil described above in combination with 2% (by volume) of an alkylbenzene, and specifically, Phenyl Octane ("PO"), also known as Octyl benzene. The second enhanced hydraulic fluid 88 tracked by line 254 comprised CAPELLA™ WF 32 brand mineral oil described above in combination with 5% (by volume) of an alkylbenzene, and specifically, Phenyl Octane ("PO"), also known as Octyl benzene. The third enhanced hydraulic fluid 88 tracked by line 256 comprised CAPELLA™ WF 32 brand mineral oil described above in combination with 10% (by volume) of an alkylbenzene, and specifically, Phenyl Octane ("PO"), also known as Octyl benzene.

The fourth enhanced hydraulic fluid 88 tracked by line 258 comprised CAPELLA™ WF 32 brand mineral oil described above in combination with 15% (by volume) of an alkylbenzene, and specifically, Phenyl Octane ("PO"), also known as Octyl benzene. The fifth enhanced hydraulic fluid 88 tracked by line 260 comprised CAPELLA™ WF 32 brand mineral oil described above in combination with 20% (by volume) of an alkylbenzene, and specifically, Phenyl Octane ("PO"), also known as Octyl benzene.

All six lines 250-260 of graph 200F demonstrate how the hydraulic fluids were tested between the shear rate range of about 5.0 sec-1 to about 1000.0 sec-1. Over this shear rate range, the apparent viscosity for the control hydraulic fluid containing no benzene tracked by line 250 ranged between about 150.0 cp to about 95.0 cp. Meanwhile, over the same shear rate range, the apparent viscosity for the first enhanced hydraulic fluid 88 having 2% of an alkylbenzene tracked by line 252 ranged between about 150.0 cp to about 80.0 cp. The apparent viscosity for the second enhanced hydraulic fluid 88 having 5% of an alkylbenzene tracked by line 254 ranged between about 150.0 cp to about 60.0 cp.

The apparent viscosity for the third enhanced hydraulic fluid 88 having 10% of an alkylbenzene tracked by line 256 ranged between about 70.0 cp to about 45.0 cp. The apparent viscosity for the fourth enhanced hydraulic fluid 88 having 15% of an alkylbenzene tracked line 258 ranged between about 51.0 cp to about 31.0 cp. The apparent viscosity for the fifth enhanced hydraulic fluid 88 having 20% of an alkylbenzene tracked by line 260 ranged between about 51.0 cp to about 25.0 cp.

All six fluids tracked by lines 250-260 generally demonstrated a decrease in slope for apparent viscosity across the shared shear rate range of about 5.0 sec-1 to about 1000.0 sec-1. However, each enhanced hydraulic fluid 88 having a greater percentage of benzene by volume had much lower viscosity ranges. These lower viscosity ranges for the enhanced hydraulic fluids 88 tracked by lines 252-260 occur in a progressive manner as the volume of benzene increases, compared to the conventional hydraulic fluid having no benzene tracked by line 250.

It was observed that a slight discrepancy exits between Line 250 of FIG. 3B and Line 226 of FIG. 2B, where both of these lines are measuring the same base, conventional CAPELLA™ brand mineral oil, sold as of this writing by CHEVRON™ oil company. As understood by one of ordinary skill in the art, this discrepancy is due to experimental error inherent in any viscosity measurements. Day-to-day, batch-to-batch, and temperature-to-temperature variations of this type are expected are not be significant one of ordinary skill in the art.

Graphs 200a-200f Summary

While Graphs 200A-F demonstrate that higher percentages by volume of benzene in the hydraulic fluids does lower the apparent viscosity in general, as noted previously, higher percentages of benzene in some situations may pose potential health risks as understood by one of ordinary skill in the art. Therefore, in view of these potential risks and in view of the viscosity data presented in Graphs 200A-200F discussed above, an ideal percentage of benzene by volume relative to a conventional hydraulic fluid without any benzene falls preferably between about 1.0% to about 20.0%, more preferably between about 1.5% to about 10.0%, and most preferably between about 2.0% to about 5.0%. The hydraulic fluid may comprise electronics coolant liquids and oils.

Some hydraulic fluids that may be mixed with benzene in the volumes described above include, but are not limited to, FLUORINERTS™ that include FC-43 and FC-70, including any perfluorinated, partially fluorinated, or partially chlorinated alkane with between about 3 to about 18 carbon atoms; mineral oils that include CAPELLA™ brand mineral oil; esther oils (synthetic or natural) that include formidals, and MIDEL™ brand esther oils. The enhanced mixture 88 typically comprises a hydraulic liquid in combination with at least one alkylbenzene. Specifically, the alkylbenzene comprises an isomer selected from at least one of n-alkylbenzenes and branched isomers. Some alkylbenzenes include, but are not limited to, octylbenzenes, and butylbenzenes.

Benzenes which may work and form the enhanced hydraulic fluid 88 include those that may be expressed by the following chemical formula:

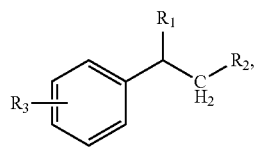

where R1, R2, and R3 can each be Hydrogen or any alkyl substituent, independent of each other as understood by one of ordinary skill in the art. Typical dielectric ranges contemplated for FLUORINETS™ type enhanced hydraulic fluids 88 having benzene is expected to be dielectric constants from about 1.5 to about 2. For ester oils and other mineral oils, the dielectric constant for the enhanced hydraulic fluid 88 with benzene is expected to be in range of about 3.5 to about 2.5 (ester oils) to about 2.5 to about 2.0 (mineral oils) respectively. Alkylbenzene reduces viscosity more in low temperature environments, such as below 200° C., compared to higher temperature environments, greater than 200° C. One preferred benzene for the enhanced hydraulic fluid 88 is octylbenzene due to its decreased health risks compared to other benzenes.

FIG. 4A is perspective view of a pressurized container 405, while FIG. 4B is front view of the pressurized container and FIG. 4C is a cross sectional view A-A of the pressurized container 405 taken along the dashed line AA of FIG. 4C.

This pressurized container 405 was used to produce the data listed in FIGS. 5A1-5D2 which will be described below. The pressurized container 405 comprises a main cylinder 407, end caps 409, and a resonating circuit 415 for testing electrical contacts/connectors 410.

The main cylinder 407 may comprise high-strength steel, (e.g., about 17-4 ph with minimum yield of about 160 ksi, and whose wall thickness is enough to withstand internal pressure of about 25 ksi [differential] through temperatures up to about 350-degF). The main cylinder 407 may comprise a length which is long enough (e.g., about 20-inches) to house an electrical relay and its contacts, the high power resonating circuit 415 (e.g. an inductor, capacitors and any resistances), as well as the enhanced hydraulic fluid 88.

The main cylinder 407 may further comprise Stub-Acme threads (male) at each end to accommodate end caps 409. The main cylinder 407 may also comprise O-Ring sealing surface finishes on a circumference, starting from the edge (end), of the cylinder and length of the band approximately 1-inch.

Each end cap 409 may comprise high-strength steel (e.g., about 17-4 ph with minimum yield of about 160 ksi, and whose wall thickness is enough to withstand internal pressure of 25 ksi (differential) through temperatures up to about 350-degF.

A first end cap 409B may comprise a mating (female) stub with acme threads to mate up to the main cylinder 407. This end cap 409A may further comprise an oil-filling port 413 with removable plug. This end cap 409A may further comprise a threaded port for a probe type temperature gage. It may further include dual O-ring grooves with o-rings.

The second end cap 409A may comprise high-strength steel (e.g., about 17-4 ph with minimum yield of about 160 ksi, and whose wall thickness is enough to withstand internal pressure of about 25 ksi (differential) through temperatures up to about 350-degF. This second end cap 409A may comprise a mating (female), stub acme threads to mate up to the main cylinder 407. The second end cap 409A may further comprise a plurality (e.g., about 7-10), of single pin, pressure bulkhead, electrical connectors (made by Kemlon) that are designed to withstand differential pressure up to 25 ksi and 350-degF. The pressure bulkhead connectors 410 provide the mechanical elements for making electrical connection between the external system and circuits and the internal resonating circuit 415. The pressure bulkhead connectors 410 may comprise ones of a low resistance type (e.g., of about less than or equal to 0.1-ohm), and high isolation (e.g., approximately greater than or equal to 1 Meg-ohms), and may conduct high currents (e.g., about greater than or equal to 10 amps or more). The second end cap 4A may further comprise Dual O-ring grooves with o-rings.

A distance D is defined between the end caps 409. This distance D was approximately sixteen inches. However, other magnitudes greater or less than this value may be employed without departing from the scope of this disclosure.

The resonating circuit 415 positioned within the main cylinder 407 may comprise an inductor that includes a toroid core made of ferrite and a Multi-turn coil (e.g., about 5-10 turns), heavy gauge wire (e.g., about 10-gauge), with a high temperature jacket (such as Teflon). The inductor may have a total inductance of between about 1.5 uH to about 1.8 uH (micro-Henry).

The capacitors for the resonating circuit 415 may comprise one or more ceramic capacitor banks connected in parallel. These capacitors may be capable of withstanding 25 ksi and may have a total capacitance of between about 7 nf to about 10 nf (nano-farad=$10^{-9}$). The operating and resonating frequency for the resonating circuit 415 was varied between 500 kHz to 1.5 MHz.

The connectors 410 exposed to the pressurized hydraulic fluid were coupled to an electrical relay. The electrical relay comprises a six-pole, double-throw, open frame, mechanical arm type relay. Each connector/contact 410 was made of a copper base material. The relay contacts provide the mechanical elements used to connect the capacitors and the inductor in parallel to form the resonating circuit 415. The relay also connected the internal resonating circuit 415 to an external RF power source 417.

The relay further included a 12-volt actuation coil, with DC resistance of between about 36 to about 40 ohms. The 12-VDC power to control the relay (actuation) was provided by external source (external to the oil-filled cylinder). The electrical resonating circuit components are mounted on a non-conducting substrate (e.g., polyimide Board) and positioned inside of the pressurized container 405. The electrical connection between the internal components in the pressurized container 405 and the external system is via the multiple single-pin, pressure bulkhead connectors 410 located on the second end cap 409A.

FIGS. 5A1-5D1 are graphs 500A1-D1 plotting data for a conventional hydraulic fluid without any benzene, such as MIDEL™ brand ester oil, sold by M&I Materials Ltd of Great Britain, described above in connection with FIG. 2A. Meanwhile, FIGS. 5A2-5D2 are graphs 500A2-D2 plotting data for an enhanced hydraulic fluid 88, specifically MIDEL™ brand ester oil having 5% octylbenzene by volume. Each graph 500 has two lines which represents two different tests using the pressurized container of FIG. 4 that were conducted at two separate times and which were about 15.0 hours apart.

Referring now to FIGS. 5A1-A2, these figures are graphs 500A1, 500A2 which illustrate plots of time in milliseconds on the X-axis versus direct current voltage on the coil of a relay (in resonating circuit 415 of FIG. 4) measured in volts on the Y-axis. Lines 502 and 504 correspond to DC voltage vs time applied to the relay's actuation coil of the resonating circuit 415 described above in connection with FIG. 4. These lines 502 and 504 also correspond to consecutive tests, completed one day apart. Both of these tests were conducted as base-line test with normal (un-modified), MIDEL Ester oil (i.e. without any viscosity reducer, such as a benzene, added). Multiple tests were completed to determine statistical significance.

Similarly, curves 501 and 503 of FIG. 5A2 correspond to voltage vs time applied to relay's actuation coil of the resonating circuit 415 described above in connection with FIG. 4. They also correspond to consecutive tests, completed one day apart. Both of these tests however were conducted with modified MIDEL™ brand ester oil 88 having about 5% octylbenzene as a viscosity reducing agent. These lines 501 and 503 indicate that the control voltage to the relay was reasonably consistent throughout the experiments. It is clear that the control voltage to the relay was in fact not higher for the tests using the modified MIDEL™ brand ester oil 88 with a viscosity reducing agent. If a higher voltage had been used, it might raise a question regarding the validity of the test (i.e., higher voltage results in higher force across contacts).

For FIGS. 5B1-B2, these figures are graphs 500B1, 500B2 which illustrate plots of time in milliseconds on the X-axis versus direct current resistance on the coil of the relay (in resonating circuit 415 of FIG. 4) measured in ohms on the Y-axis. Comparing line 506 of graph 500B1 to line 505 of graph 500B2, we see a change in electrical resistance from about 25.0 milliohms at point 544 on line 506 to about less than 5.0 milliohms at point 546 on line 505 which is significant.

Similar to the data lines in FIG. 5A1 and FIG. 5A2, the data lines 506 and 508 in FIG. 5B1 reflect absence of a viscosity reducing agent and while data lines 505 and 507 of FIG. 5B2 reflect presence of about a 5% Viscosity Reducing agent (octylbenzene) respectively (added to MIDEL™ brand ester oil 88). FIGS. 5B1 and 5B2 have two sets of data lines or curves 506/508 and 505/507. Each set comprises repeat tests for statistical significance (confirmation). These set of data lines (506/508, 505/507) of FIG. 5B are important because they show how the quality of electrical connection in the contacts is affected by adding the viscosity reducing agent. The curves correspond to DC Resistance (measured in ohms on the Y-axis) vs. time (in millisec on the X-axis).

As illustrated, the first set of data lines 506/508 of FIG. 5B1 contain very severe episodes of contact breakdown (illustrated in the form of high Resistance spiking). Data line 506 shows spiking early in test sequence, see for example point 544 on data line 506. Data line 508 shows breakdown at a later stage (at about 4500 millisec). Meanwhile, there are very minor breakdowns for the data lines 505/507 of FIG. 5B2. Observe the significantly reduced resistance at point 546 on data line 505 of FIG. 5B2 compared to the high resistance at point 544 of data line 506 of FIG. 5B1.

The data lines 505/507 shown in FIG. 5B2 correspond to tests after 5% viscosity reducing (octylbenzene) was agent was added to MIDEL™ brand ester oil form the enhanced hydraulic fluid 88. It can be seen that the electrical contact breakdown was greatly minimized (point 546 of data line 505), and eliminated in one of the tests (data line 507). This observation was confirmed in repeat tests. In thousands of contact switch operations (relay switches) used in a bore hole assembly ("BHA") context, this can be a very significant issue.

For FIGS. 5C1-C2, these figures are graphs 500C1, 500C2 which illustrate plots of time in milliseconds on the X-axis versus dc current on the coil of the relay (in resonating circuit 415 of FIG. 4) measured in amperes on the Y-axis. Similar to the data lines 502/504 in FIG. 5A1 and 501/503 of FIG. 5A2, and those in FIG. 5B1 and FIG. 5B2, the set of data lines 510/512 in FIG. 5C1 and the data line 509 in FIG. 5C2 were conducted without any viscosity reducing agent (FIG. 5C1) and with an about 5% viscosity reducing agent (octylbenzene) (FIG. 5C2) added to form an enhanced hydraulic fluid.

These set of data lines 510/512 and 509 correspond to the direct current ("DC") (measured in amps-DC) flowing into the actuating coil of the relay. The data line 509 shows that no additional current flowed into the actuating coil for the tests which included the viscosity reducing agent. It is clear from FIGS. 5C1 and 5C2 that the control current to the relay was in fact not higher for the tests using the modified MIDEL™ brand ester oil having a viscosity reducing agent to form an enhanced hydraulic fluid 88. If a higher current had been used, it might raise a question regarding the validity of the test (i.e., higher current results in higher force across contacts)

For FIGS. 5D1-D2, these figures are graphs 500D1, 500D2 which illustrate plots of time in milliseconds on the X-axis versus RF voltage across the contacts 410 of FIG. 4 measured in Hz on the Y-axis. Similar to the data lines 502/504 in FIG. 5A1 and data lines 501/503 of FIG. 5A2, tests were conducted without any viscosity reducing agent (data lines 514/516) and tests with about 5% viscosity reducing agent (octylbenzene) added to MIDEL™ brand ester oil forming the enhanced hydraulic fluid 88.

The set of data lines 514/516 in FIG. 5D1 and data line 513 of FIG. 5D2 correspond to radio frequency ("RF") signals across the relay contacts described above in connection with FIG. 4. These data lines 515/516 and 513 demonstrate that similar RF power was used for both sets of tests (without viscosity reducer for data lines 514/516 and with an about 5% reducer for an enhanced hydraulic reducer 88 represented by data line 513). As illustrated, there is more of a disturbance/disruption shown in the data lines 514 and 516 compared to the data line 513 when the viscosity reducer was used. Subsequent test and field implementation showed that when an about 5% viscosity reducer was used to create the enhanced hydraulic fluid 88, then the RF signal coupled across the relay contacts (in pressurized oil) the signal integrity was un-compromised.

Figure 6:
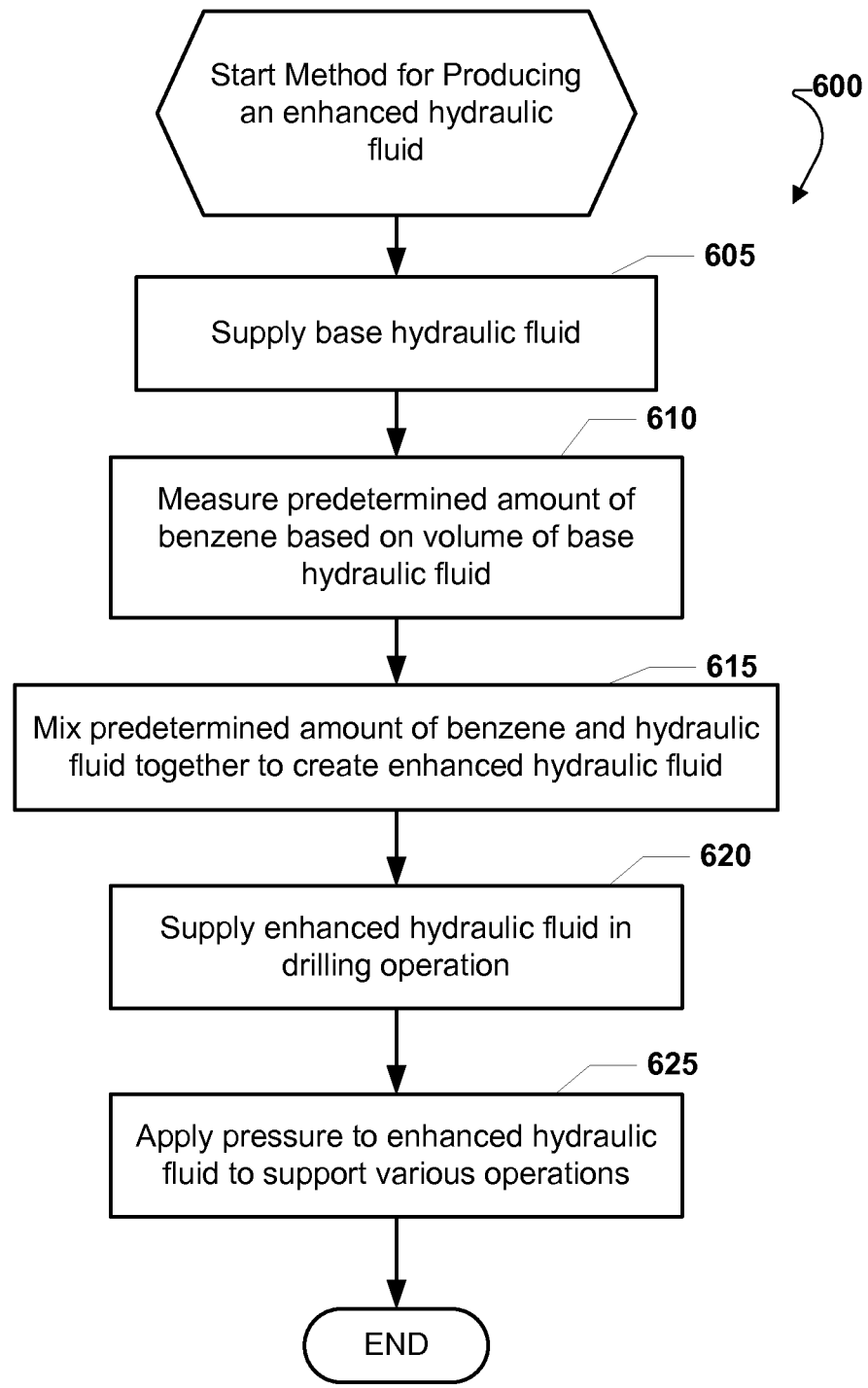
FIG. 6 is a flow chart illustrating a method for producing an enhanced hydraulic fluid.

FIG. 6 is a flow chart illustrating a method 600 for producing an enhanced hydraulic fluid 88. Block 605 is the first step of method 600. In block 605, a base hydraulic fluid is supplied. As noted above, the base hydraulic fluid may include, but is not limited to, FLUORINERTS™ that include FC-43 and FC-70, including any perfluorinated, partially fluorinated, or partially chlorinated alkane with between about 3 to about 18 carbon atoms; mineral oils that include CAPELLA™ brand mineral oil; esther oils (synthetic or natural) that include formidals, and MIDEL™ brand esther oils.

Next in block 610, a predetermined amount of benzene based on volume of the hydraulic fluid is measured. As noted above, the benzene may comprise an alkylbenzene. Specifically, the alkylbenzene may comprise an isomer selected from at least one of n-alkylbenzenes and branched isomers. Some alkylbenzenes include, but are not limited to, octylbenzenes, and butylbenzenes.

Benzenes which may work and form the enhanced hydraulic fluid 88 include those that may be expressed by the following chemical formula:

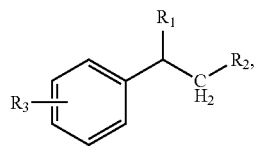

where R1, R2, and R3 can each be Hydrogen or any alkyl substituent, independent of each other as understood by one of ordinary skill in the art.

An ideal percentage of benzene by volume relative to the conventional hydraulic fluid without any benzene falls preferably between about 1.0% to about 20.0%, more preferably between about 1.5% to about 10.0%, and most preferably between about 2.0% to about 5.0% by volume.

Next, in block 615, the predetermined amount of benzene from block 610 is mixed together with the conventional hydraulic fluid to create the enhanced hydraulic fluid 88. Specifically, the fluids may be mixed manually or automatically by stirring at about 10.0 revolutions per minute (r.p.m). Other mixtures may be agitated using an automated mixer such as between about 20 rpm to about 50 RPM. The mixing may be conducted over several minutes on the order of about 1.0 to about 5.0 minutes. One of ordinary skill the art will recognize that other mechanical and/or automated agitation and other magnitudes of revolutions per minute (r.p.m.) for the mixing of the two fluids may be employed without departing from the scope of the disclosed system.

Subsequently, in block 620, the resulting enhanced hydraulic fluid 88 may be supplied in a drilling operation. Specifically, the enhanced hydraulic fluid 88 may be provided in fluid communication with a mechanical pressure compensation system 177 (See FIG. 1C) of a tool/modules 120, 130 of bottom hole assembly 100.

Next, in block 625, pressure may be applied to the enhanced hydraulic fluid 88 to support various drilling operations. In the case of a mechanical pressure compensation system 177, pressure is applied to the enhanced hydraulic fluid 88 to equalize the pressure within the bottom hole assembly 100 with the exterior of the bottom hole assembly. The pressure applied may range from about 100 pounds per square inch ("psi") to about 100,000 psi.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the disclosure. In some instances, certain steps may be omitted or not performed without departing from the invention. Further, words such as "thereafter", "then", "next", etc. are not intended to limit the order of the steps. These words are simply used to guide the reader through the description of the sample methods described herein.

Although only a few embodiments have been described in detail above, those skilled in the art will readily appreciate that many modifications are possible in the embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

What is claimed is:
1. A downhole tool, comprising:
an enhanced hydraulic fluid that comprises:
a base hydraulic fluid; and a predetermined amount of benzene by volume relative to the base hydraulic fluid, the predetermined amount of benzene comprises between about 1.0% to about 20.0% benzene by volume;

wherein the enhanced hydraulic fluid is contained within the downhole tool and isolated from external of the downhole tool.

2. The downhole tool of claim 1, wherein the predetermined amount of benzene comprises between about 1.5% and 10.0% benzene by volume.

3. The downhole tool of claim 1, wherein the predetermined amount of benzene comprises between about 2.0% and 5.0% benzene by volume.

4. The downhole tool of claim 1, wherein the base hydraulic fluid comprises at least one of: an electronic coolant liquid; a perfluorinated, partially fluorinated, or partially chlorinated alkane with between about 3 to about 18 carbon atoms; a mineral oil; a synthetic esther oil; a natural esther oil; and a formidal.

5. The downhole tool of claim 1, wherein the benzene comprises an alkylbenzene.

6. The downhole tool of claim 5, wherein the alkylbenzene comprises an isomer selected from at least one of n-alkylbenzenes and branched isomers.

7. The downhole tool of claim 5, wherein the alkylbenzene comprises at least one of an octylbenzene and butylbenzene.

8. A method comprising:
supplying an enhanced hydraulic fluid comprising a base hydraulic fluid and a predetermined amount of benzene between about 1.0% to about 20.0% benzene by volume;
introducing the enhanced hydraulic fluid into a downhole tool; and
operating the downhole tool with the enhanced hydraulic fluid contained within the downhole tool and isolated from external of the downhole tool.

9. The method of claim 8, further comprising providing the enhanced hydraulic fluid in a drilling operation.

10. The method of claim 9, further comprising placing the enhanced hydraulic fluid in fluid communication with a mechanical pressure compensation system.

11. The method of claim 8, wherein the predetermined amount of benzene comprises between about 1.5% and 10.0% benzene by volume.

12. The method of claim 8, wherein the predetermined amount of benzene comprises between about 2.0% and 5.0% benzene by volume.

13. The method of claim 8, wherein the base hydraulic fluid comprises at least one of: an electronic coolant liquid; a perfluorinated, partially fluorinated, or partially chlorinated alkane with between about 3 to about 18 carbon atoms; a mineral oil; a synthetic esther oil; a natural esther oil; and a formidal.

14. The method of claim 8, wherein the benzene comprises an alkylbenzene.

15. The method of claim 14, wherein the alkylbenzene comprises an isomer selected from at least one of n-alkylbenzenes and branched isomers.

16. A system comprising:
an enhanced hydraulic fluid comprising:
a base hydraulic fluid;
a predetermined amount of benzene by volume relative to the base hydraulic fluid, the predetermined amount of benzene comprises between about 2.0% and 5.0% benzene by volume, the benzene comprising an alkylbenzene that includes an isomer selected from at least one of n-alkylbenzenes and branched isomers; and
a downhole assembly containing the enhanced hydraulic fluid;
wherein the enhanced hydraulic fluid is contained within the downhole assembly and isolated from external of the downhole assembly.

17. The system of claim 16, wherein the base hydraulic fluid comprises at least one of: an electronic coolant liquid; a perfluorinated, partially fluorinated, or partially chlorinated alkane with between about 3 to about 18 carbon atoms; a mineral oil; a synthetic esther oil; a natural esther oil; and a formidal.

18. The system of claim 17, wherein the alkylbenzene comprises at least one of an octylbenzene and butylbenzene.

19. The system of claim 18, further comprising a bore hole assembly, the bore hole assembly containing the enhanced hydraulic fluid.

20. The system of claim 19, further comprising a pressure compensation system coupled to the bore hole assembly.

* * * * *